J. A. WARD.
SIGNALING DEVICE FOR AUTOMOBILES.
APPLICATION FILED JUNE 19, 1917.
1,318,627.
Patented Oct. 14, 1919.
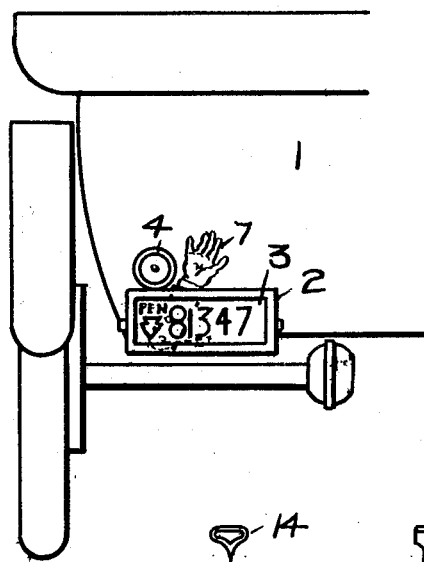
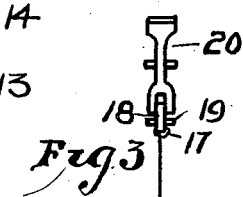
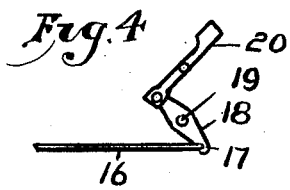
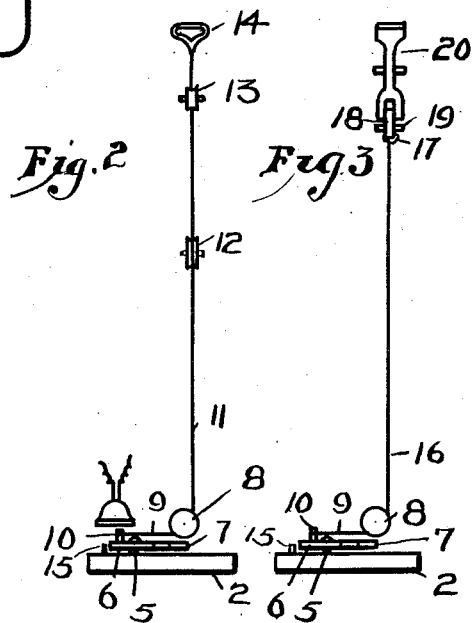
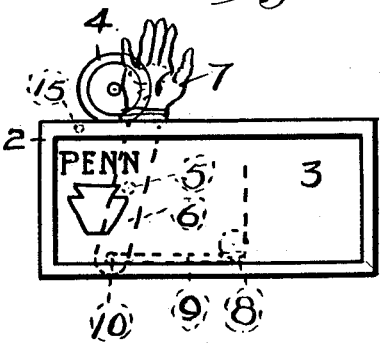
WITNESS
INVENTOR.
John A. Ward

UNITED STATES PATENT OFFICE.

JOHN A. WARD, OF PITTSBURGH, PENNSYLVANIA.

SIGNALING DEVICE FOR AUTOMOBILES.

1,318,627.      Specification of Letters Patent.      Patented Oct. 14, 1919.

Application filed June 19, 1917. Serial No. 175,606.

*To all whom it may concern:*

Be it known that I, JOHN A. WARD, a citizen of the United States of America, residing at Pittsburgh, county of Allegheny, and State of Pennsylvania, have invented certain new and useful Improvements in Signaling Devices for Automobiles, of which the following is a specification.

This invention relates to a signaling device for automobiles, and has for its object to provide means, in a manner hereinafter set forth, to signal to a vehicle approaching from the rear to slow up or stop.

A further object of this invention is to provide a signaling device, in a manner hereinafter set forth, including a signal arm, visible during the day, and having means associated therewith to cause it to become visible at night, so that the driver of a vehicle approaching from the rear will see the signal arm.

Further means of the invention are to provide signaling device for automobiles which is simple in its construction, strong, durable, efficient and convenient in its use, readily set up and comparatively inexpensive.

With the foregoing and other objects in view the invention consists of a novel construction, combination and arrangement of parts, as hereinafter more specifically described and illustrated in the accompanying drawings, wherein is shown an embodiment of the invention, but it is to be understood that changes, variations, and modifications can be resorted to, which fall within the scope of the claim hereunto appended.

In the drawings, wherein like reference characters denote corresponding parts throughout the several views:

Figure 1 is a rear elevation of a portion of an automobile showing the adaptation therewith of a signaling device in accordance with this invention.

Fig. 2 is a plan illustrating the operating means for the signal arm.

Fig. 3 is a similar view of a modified form of operating means.

Fig. 4 is the detail of the operating means illustrated in Fig. 3.

Fig. 5 is an enlarged elevation illustrating the signal arm arranged in connection with a support for the license plate.

Referring to the drawings in detail 1, denotes an automobile having secured to the rear of the body thereof a support or frame 2, for a license plate 3. Arranged above the frame 2, is one of the rear lamps, electric, 4, of the vehicle. The frame 2, is positioned well in advance of the lamp 4, for the purpose to be presently referred to:—

Pivotally connected, intermediate its ends, as at 5, to the rear of the frame 2, is a lever arm 6, which is normally disposed at an inclination and extended above the top edge of the frame 2. Carried on the upper end of the lever and arm 6, is a representation of a hand, 7, formed of transparent material. The lever 6, and hand 7, form a signal arm and the transparent upper portion thereof is adapted to be shifted in front of the lamp 4, so that at night when the lamp 4, is illuminated the transparent portion 7, of the signal arm will be visible. The frame 2, is spaced from the lamp 4, so that the signal arm can be shifted to a more normal position when occasion so requires.

Supported from the rear of the frame 2, is a pulley 8, over which passes a flexible member 9, having one end connected, as at 10, to the lower end of the lever 6.

In Fig. 2, the flexible member 9 assumes a continuation of the flexible member 11 which is disposed longitudinally of the machine body, passes over a pulley 12 under a pulley 13, then upward and terminates in a handle 14, which is in convenient reach of the driver of the machine. By this arrangement, when it is desired to shift the signal arm to signaling position, which is perpendicular, the driver pulling on the handle 14, will swing the lever 6, on its pivot and move the transparent portion 7, of the signal arm to conceal the lamp 4. A stop 15, is provided on the frame 2, to limit movement in one direction of the lever 6.

The transparent portion 7, of the signal arm is weighted, provides what may be termed a counter-balance, so that when the handle or grip 14, is released the signaling arm will automatically form its normal or inoperative position.

In Fig. 3, of the drawings, the flexible member 9, is connected to the rod 16, which is pivotally connected at 17, to one end of the lever 18, the latter is pivoted as at 19, and coupled with a foot-tread 20, by a pair of links 21. When the foot-tread 20 is operated the lever 18 will be swung on its pivot and the signal arm moved to operative position.

What I claim is:

A signaling device for motor vehicles comprising a support adapted to be arranged at the rear of the vehicle, a lever arm pivoted centrally of its ends with the rear of said support and normally extending at an inclination from the perpendicular, a pulley connected with the back of said support, a lamp arranged above and rearwardly of the support and further completely above the pivot of the lever arm, an element transparent throughout carried on the upper end of said arm and above the support, said element positioned forwardly of and adapted to be shifted in front of the lamp, a flexible member connected to the lower end of said arm and passing over said pulley, and means for shifting the flexible member to move said element in front of the lamp.

In testimony whereof I affix my signature in the presence of two witnesses.

JOHN A. WARD.

Witnesses:
E. N. LONG,
MAX H. SROLOVITZ.